(12) United States Patent
Elefsrud

(10) Patent No.: US 6,966,687 B1
(45) Date of Patent: Nov. 22, 2005

(54) DISPOSAL OF CEMENT WASTE FROM CHUTE

(76) Inventor: Kevan P. Elefsrud, P.O. Box 460517, Escondido, CA (US) 92046-0517

( * ) Notice: Subject to any disclaimer, the term of this patent is extended or adjusted under 35 U.S.C. 154(b) by 1 day.

(21) Appl. No.: 10/398,357

(22) PCT Filed: Oct. 9, 2001

(86) PCT No.: PCT/US01/31372

§ 371 (c)(1),
(2), (4) Date: Apr. 4, 2003

(87) PCT Pub. No.: WO02/28683

PCT Pub. Date: Apr. 11, 2002

Related U.S. Application Data

(63) Continuation-in-part of application No. 09/681,000, filed on Oct. 6, 2000, now Pat. No. 6,461,098.

(51) Int. Cl.[7] .............................. B28C 5/42; B28C 5/48
(52) U.S. Cl. ..................... 366/26; 366/62; 366/110
(58) Field of Search .............................. 366/1–2, 5, 26, 366/30, 36, 39, 41, 44, 53–60, 62, 68, 138, 366/348, 349, 606, 110, 114, 117, 118, 120; 414/408

(56) References Cited

U.S. PATENT DOCUMENTS

| | | | | |
|---|---|---|---|---|
| 3,112,100 A | * | 11/1963 | Prichard | |
| 3,246,884 A | * | 4/1966 | Prichard et al. | |
| 4,175,903 A | * | 11/1979 | Carson | |
| 4,268,175 A | * | 5/1981 | Norlie et al. | |
| 4,722,658 A | * | 2/1988 | Wurtz et al. | |
| 5,127,740 A | * | 7/1992 | DeBoer | |
| 5,685,978 A | * | 11/1997 | Petrick et al. | |
| 5,695,280 A | * | 12/1997 | Baker et al. | |
| 5,741,065 A | * | 4/1998 | Bell et al. | |
| 6,015,225 A | * | 1/2000 | Williams | |
| 6,039,468 A | * | 3/2000 | Kowalcyzk | |
| 6,155,277 A | * | 12/2000 | Barry | |
| 6,461,098 B1 | * | 10/2002 | Elefsrud | |
| 6,640,817 B2 | * | 11/2003 | Harmon | |

FOREIGN PATENT DOCUMENTS

| | | | |
|---|---|---|---|
| DE | 4336029 A1 | * | 6/1994 |
| DE | 19530143 A1 | * | 2/1997 |
| EP | 062339 A2 | * | 10/1982 |
| FR | 2667012 | * | 3/1992 |
| JP | 7-179147 | * | 7/1995 |
| JP | 11-221486 | * | 8/1999 |
| JP | 2003-170414 | * | 6/2004 |

* cited by examiner

Primary Examiner—Charles E. Cooley
(74) Attorney, Agent, or Firm—David A. Belasco; Belasco Jacobs & Townsley, LLP

(57) ABSTRACT

An apparatus and method for collecting and transporting concrete waste includes a container, a cart for supporting and moving the container and a mechanism attached to the frame of a cement truck for lifting the cart and container off the ground for transport. The apparatus may be stored on a cement truck so that the apparatus prevents disposal of cement and concrete waste in an unlawful or unsightly manner and allows the cement and concrete waste to be returned to a cement and concrete production facility and recycled. The cart includes a mechanism for tilting the container about its midsection using an elongated lever or handle.

20 Claims, 13 Drawing Sheets

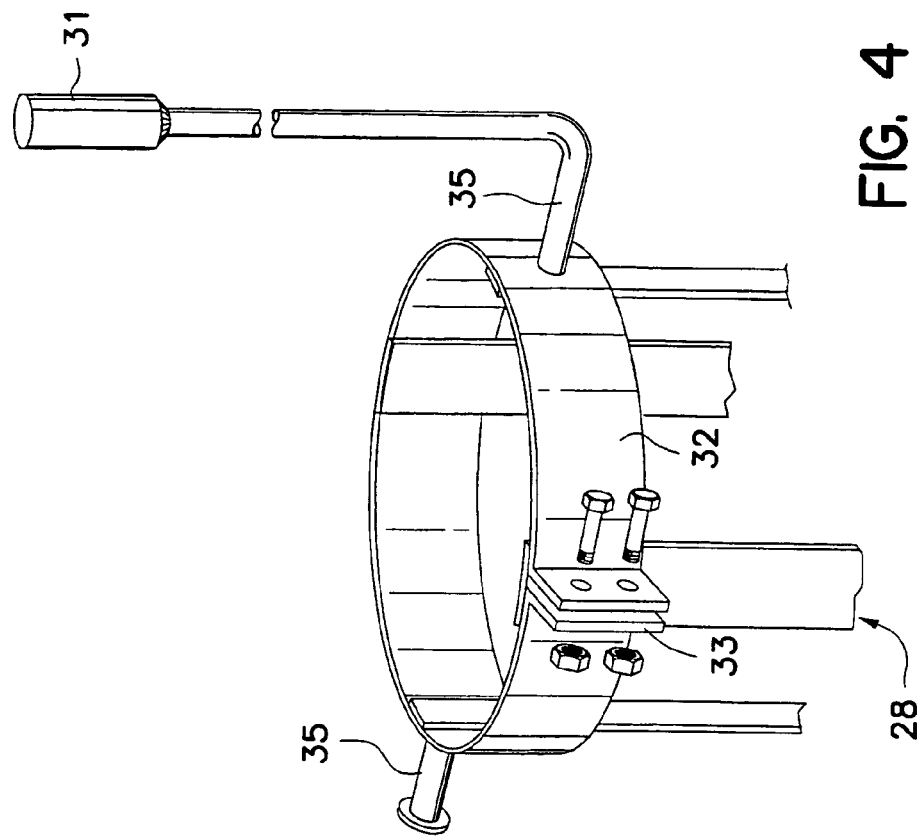
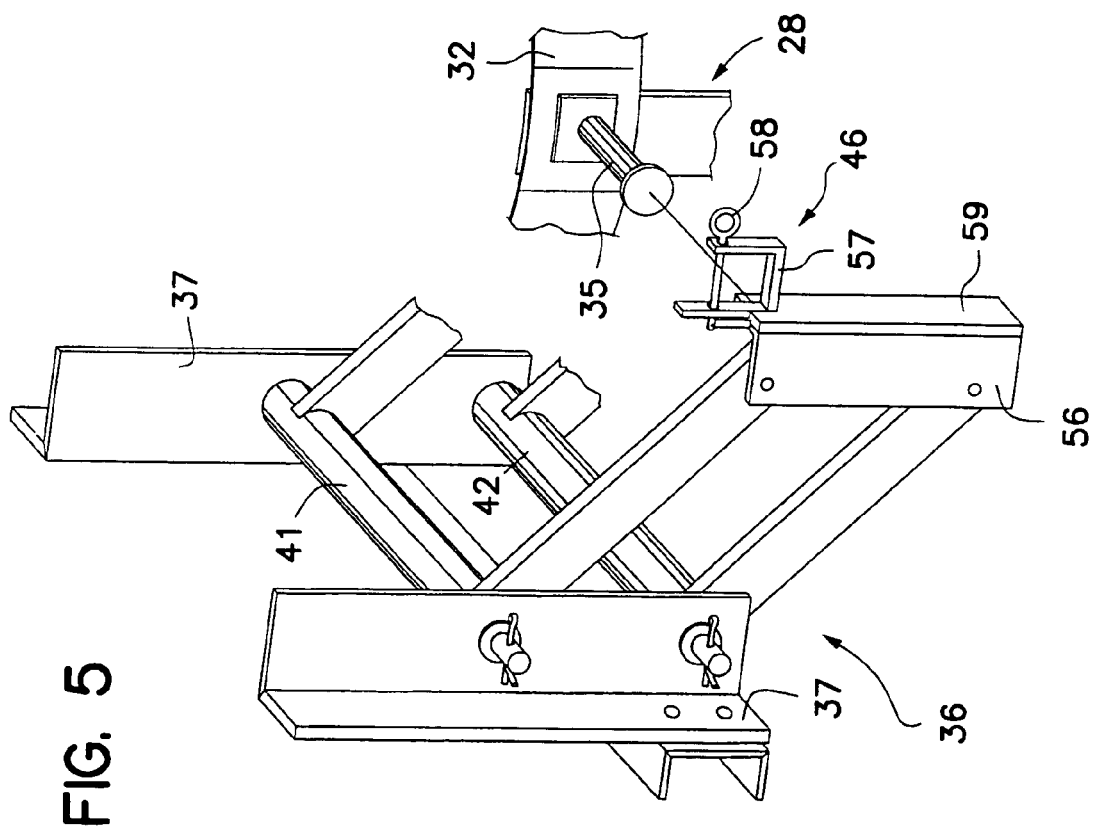
FIG. 4
FIG. 5

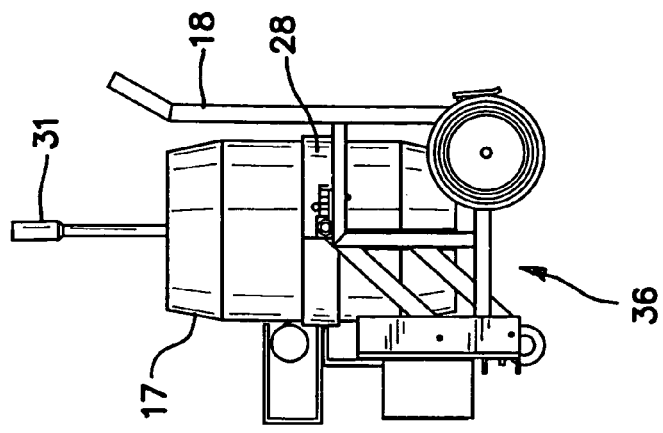
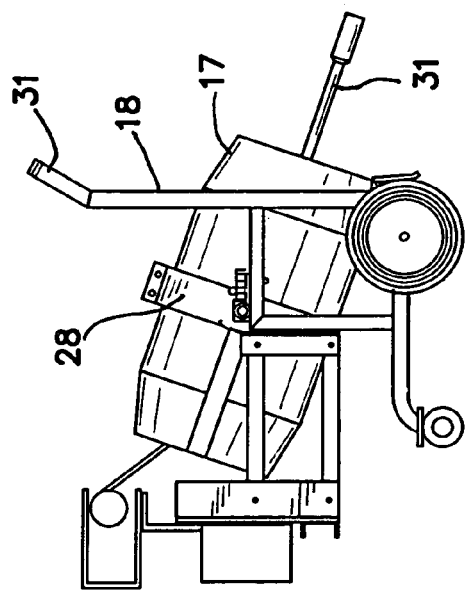
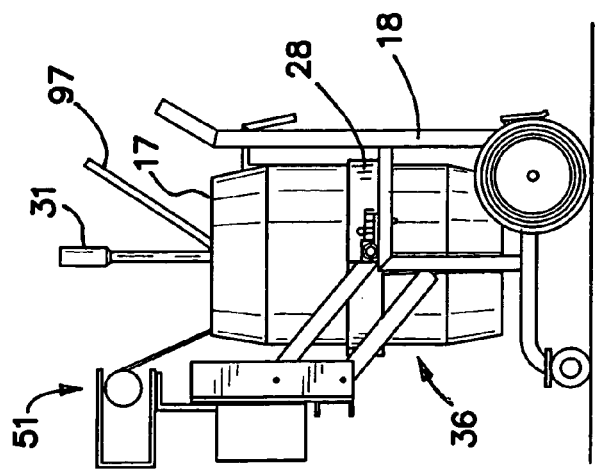
FIG. 6C
FIG. 6B
FIG. 6A

DISPOSAL OF CEMENT WASTE FROM CHUTE

This application is a continuation-in-part of Ser. No. 09/681,000 filed Oct. 6, 2000 now U.S. Pat. No. 6,461,098.

TECHNICAL FIELD

This invention relates to an apparatus and method for clean up and disposal of cement and concrete waste. The use of the subject apparatus and method facilitates the clean up of cement and concrete waste at the job site. Cement trucks having a cement mixing drum connected to a chute for delivering mixed concrete from the mixer to a particular location are commonly used throughout the country in the construction of buildings, roads, and other concrete structures. When the job in finished, the cement within the chute, must be cleaned before the truck leaves the job site. Otherwise, the concrete will harden making it difficult or impossible to clean off the chute. It is common practice to wash the waste from the chute onto the ground, into a wheelbarrow, or into a nearby storm drain. However, such disposal usually violates local laws or ordinances governing the disposal of concrete or cement waste. Nevertheless, this is done regularly, either intentionally or unintentionally, because no other facilities are available at a job site to clean up the concrete waste. This invention protects the environment by keeping cement and concrete waste from being disposed of into the storm sewers.

BACKGROUND OF THE INVENTION

Cummins U.S. Pat. No. 6,033,178 disclosed a device that mounts to the rear tail gate of a pick up truck and allows the user to lift the trash container off the ground for transport. Cummins discloses an articulating support frame which is attached to the back of a pick up truck. The frame engages the trash container and lifts it to a raised position for transport by the vehicle.

Mottin U.S. Pat. No. 3,083,849 discloses an apparatus for collecting waste materials including a waste container which is hydraulically lifted and dumped into a truck.

Updik, Jr. U.S. Pat. No. 3,762,586 discloses a refuse collection vehicle and a front loading bin which may be hydraulically raised to dump the refuse therein into the main body of the vehicle.

BRIEF SUMMARY OF THE INVENTION

The present invention fills an environmental need for an apparatus and method for facilitating and enabling the disposal of concrete and cement waste. The present invention provides an apparatus and method that allows the waste in the concrete delivery chute or otherwise on the job site to be removed easily and transported to the cement production facility or some other remote location where it may be recycled.

In one embodiment of this invention, the apparatus includes a container to receive cement and concrete waste. The container is a barrel or other receptacle which may be made of metal, plastic or any other suitable material. The apparatus further includes some facilities for supporting the container, such as a cart which allows the container to be moved easily along the ground. The cart, preferably, has a brake to allow its movement to be slowed or stopped by an operator. The cart includes facilities for securing the container onto the cart. The cart preferably includes a means for tilting the container to facilitate dumping the cement waste from the container, preferably while the container is attached to the lifting assembly.

A lifting assembly is mounted to the frame of a cement mixer truck, preferably between the cab of the truck and the mixer, for lifting the cart and the container mounted thereto off the ground for transport of the cement waste to a remote location, typically the concrete production facility where it can be recycled. The lifting assembly comprises a means for lifting the arms of the lifting assembly, which means can include a electric or manual winch, a hydraulic lift or electric motor with gears, which can be operated to lift the heavy cart and container off the ground. The electric winch or electric motor can be powered by the battery of the truck. After the cart is engaged by the lifting assembly, it is secured to the truck so that it can be safely transported.

The container may include a removable colander type strainer at the opening of the container for collecting larger particles from the cement waste, such a gravel, rocks, debris and the like.

In addition, the container may optionally be covered by a lid during transport. A typical lid will include a clamp ring to securely hold the lid on the container, with a releasable latch on the clamp ring to allow easy securing and/or removal of the lid on the container. Preferably, the lid is configured to be secured on the container when the container also has the colander type strainer mounted on the opening of the container.

An optional agitation or vibrating assembly may also be mounted to agitate the waste in the container to prevent the cement from setting during transport. This may be externally mounted to the container or a vibrating element may be extended into the concrete waste in the container to vibrate it from either the top, bottom or sides of the container.

The subject method of this invention includes positioning a drum or container under the chute of the cement truck so that material collected from washing the chute can be deposited into the container. Waste located in the chute is washed from the chute and collected in the container. Additional waste may also be removed from the job site by hand and deposited into the container. The container is then moved to a position where it can be lifted onto the frame of the cement truck. The container is then lifted onto the cement truck and is secured to allow safe transport of the container to a remote location.

Use of the apparatus and method of this invention avoids depositing cement or concrete waste in locations that may violate laws or ordinances. By storing the container on the cement truck when it is not in use, it insures that a convenient apparatus and method of concrete and cement disposal is always available when the cement truck is present. When the cement truck returns to the cement or concrete production facility, the waste may be recycled and used in future cement or concrete production. Alternatively, it may be safely disposed of at the production facility, if desired.

Also contemplated is the container and cart assembly portion as a separate component, useful for the collection and movement of liquid waste materials.

Further aspects of the present invention will become apparent from the following detailed description when considered in conjunction with the accompanying drawings. It should be understood, however, that the detailed description and the specific examples while representing the preferred embodiments are given by way of illustration only.

BRIEF DESCRIPTION OF THE DRAWINGS

FIG. 4 is a perspective view of a portion of the cage assembly.

FIG. 5 is a perspective view of a portion of the lifting assembly.

FIGS. 6A, 6B and 6C illustrates the apparatus of this invention in three different positions.

DETAILED DESCRIPTION OF THE INVENTION

The following description is of the best presently contemplated modes of carrying out the inventions. This description is made for the purpose of illustrating the general principles of the invention and should not be taken in a limiting sense.

Figure 1:
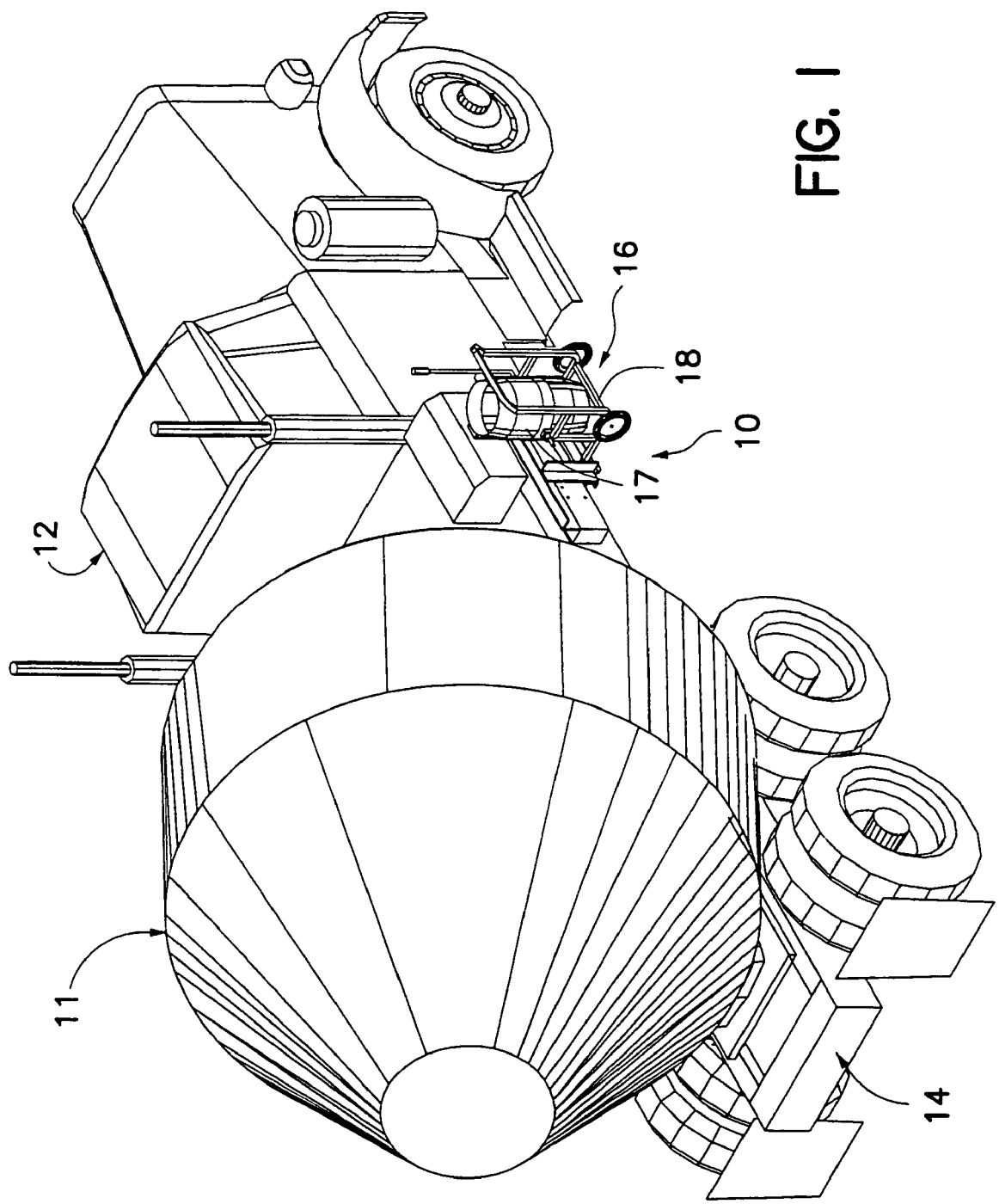
FIG. 1 is a perspective view of a cement truck having apparatus for disposal of cement waste in accordance with the principles of this invention.

In accordance with the present invention, there is shown in FIG. 1 a cement truck generally designated as 10. The cement truck has a mixer 11, a cab 12, and a frame 14. Mounted behind the cab 12, and before the mixer 11 is disposal apparatus generally designated as 16. This apparatus includes a container 17 which is mounted on a cart 18. While the disposal apparatus 16 is shown as being mounted behind the cab 12, which is the most convenient place to do so, it may nevertheless be mounted elsewhere on the frame 14 for transport of the concrete waste to a remote location.

Figure 2:
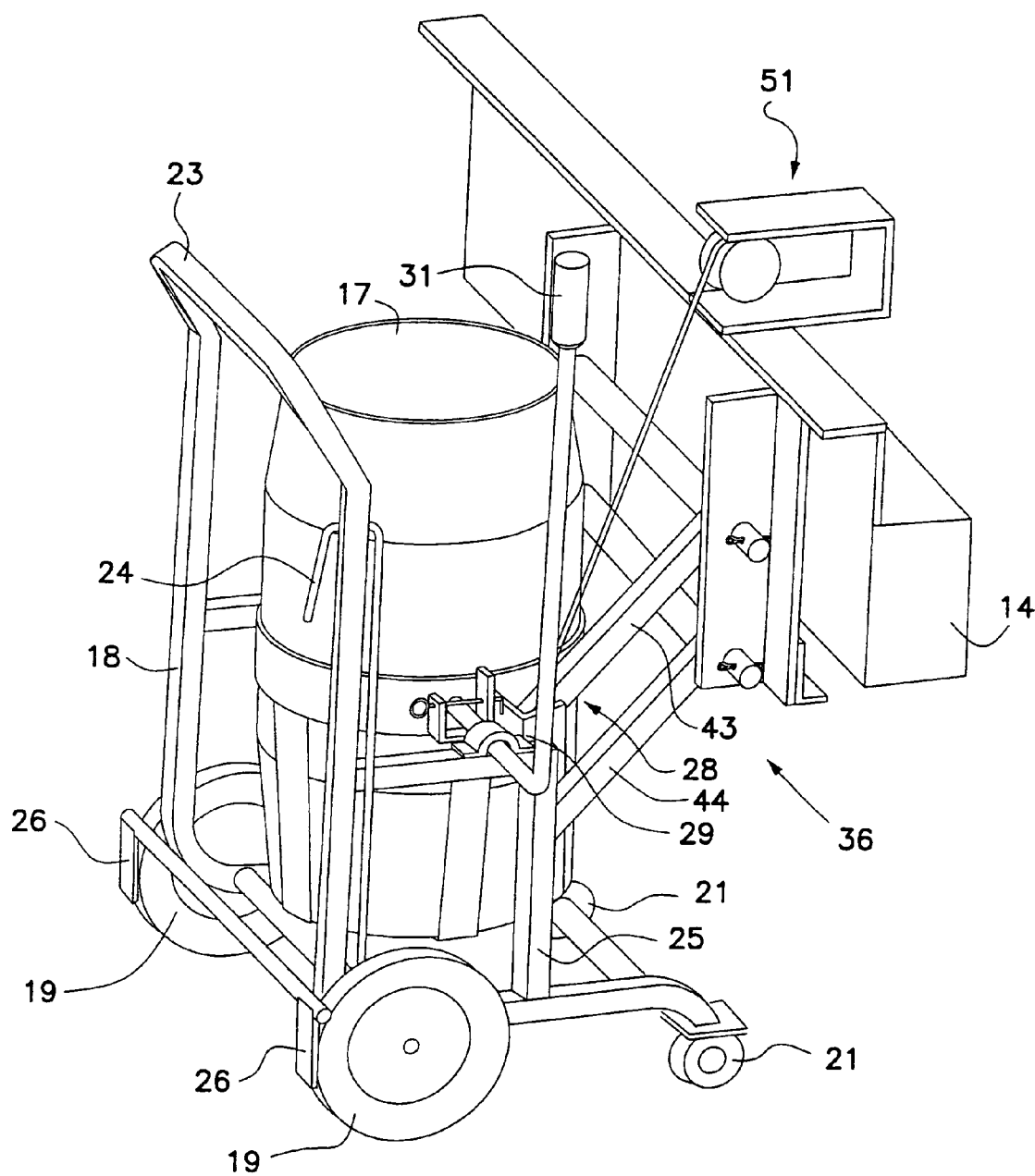
FIG. 2 is a perspective view of the container, cart, cage assembly and lifting assembly, and a portion of the frame of the cement truck.

Referring to FIG. 2, the container 17 is shown mounted on the cart 18. The cart 18 includes a pair of rear wheels 19 and a pair of front wheels or casters 21. The wheels are either the same or different sizes if desired. The use of the large wheels 19 and the smaller caster 21 allow the cart to be rolled flat or tilted back like a hand truck. The wheels 21 are preferably casters so they allow the cart to be rotated easily if desired for positioning the cart both beneath the chute (not shown) of the cement truck, or positioning it near the lifting assembly identified generally as 36, which is mounted to the truck frame 14 as described more fully hereinafter. The cart 18 includes a handle 23 and a frame 25.

Figure 15B:
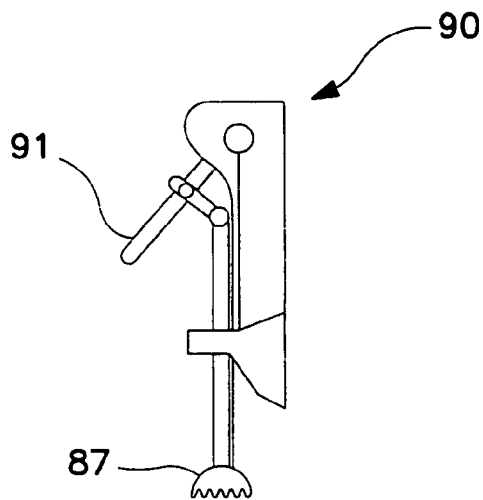
FIGS. 15A and 15B illustrate alternative brake mechanisms.
Figure 15A:
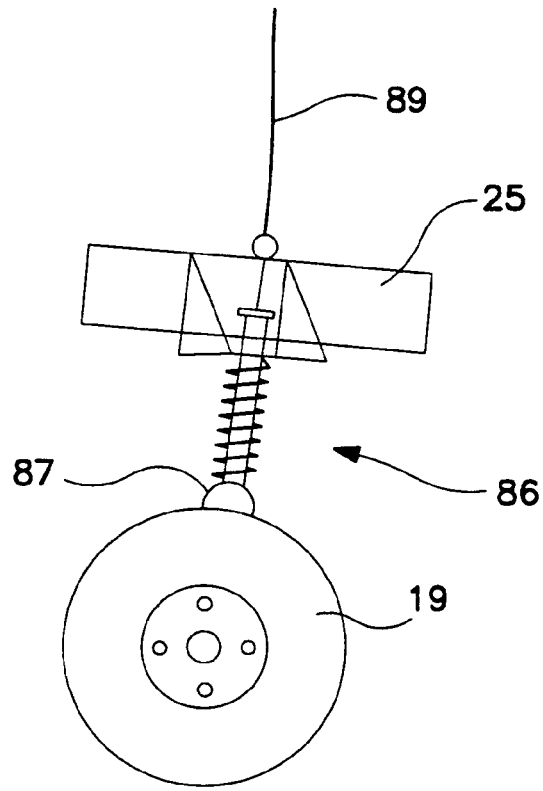
Figure 16:
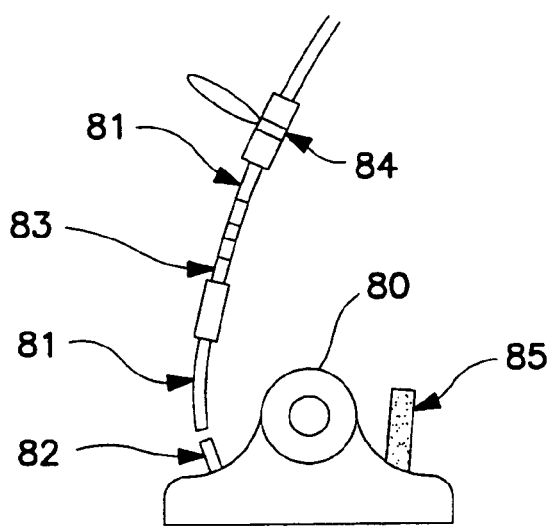
FIG. 16 illustrates the component parts of a preferred pneumatic vibrator engine.

Cart 18 also includes a parking brake to prevent wheel rotation and movement of the cart. In one embodiment shown in FIG. 2, parking brake handle 24 which when pulled moves a pair of plates 26 against each wheel 19 to slow or prevent the wheels from rotating. Alternatively, a cable brake assembly 86 shown in FIG. 15A can comprise a brake pad 87 that can compress against wheel 19 and thereby restrict wheel rotation by the force of expansion spring 86 located on cable 89 between brake pad 87 and a lower horizontal strut of cart frame 25. The cable can be conveniently routed up the cart frame 25 to cart handle 23 onto a hand release lever (not shown) mounted on the cart handle. Pulling the cable compresses spring 86 and releases brake pad 87. In another embodiment shown in FIG. 15B, manual brake assembly 90 which comprises brake pad 87 and manual actuating brake handle 91 can be mounted onto a vertical strut of cart frame 25 above wheel 19, or mounted onto a horizontal strut of cart frame 25 adjacent to wheel 19, such that the locked position of the manual brake handle compresses brake pad 87 against the wheel and thereby restrict wheel rotation.

The container 17 is supported by a cage assembly 28 which is rotatably mounted to the frame 25 of the cart 18. The frame 25 has a pair of means for pivot 29 mounted thereto for receiving a pair of shafts 35 connected to the cage assembly 28 which is shown in FIG. 4. The means for pivot 29 can be a pillow block bearing, bushings, babbitted two piece bearings, and the like pivot means. The cage assembly 28 has a top band 32 to which shafts 35 are welded on opposite sides. The top band 32 may be separable at 33 to allow easy insertion of container 17. A handle 31 is mounted to one shaft 35 of the cage assembly 28 to allow the container 17 to be tilted to either allow the contents of the container 17 to be dumped or to align the container 17 with the chute so that material can be washed out of the chute into the container relatively easily. The handle 31 can be moved forward or backwards while the cart is on the ground to tilt the container in either direction from dumping. Thus, the cage can be rotated relative to the cart 18 by moving the handle 31 either forward or backward. When the cart 17 is loaded on the truck, the cart can be tilted backwards for dumping without it being disengaged from the truck.

Figures 8A, 8B:
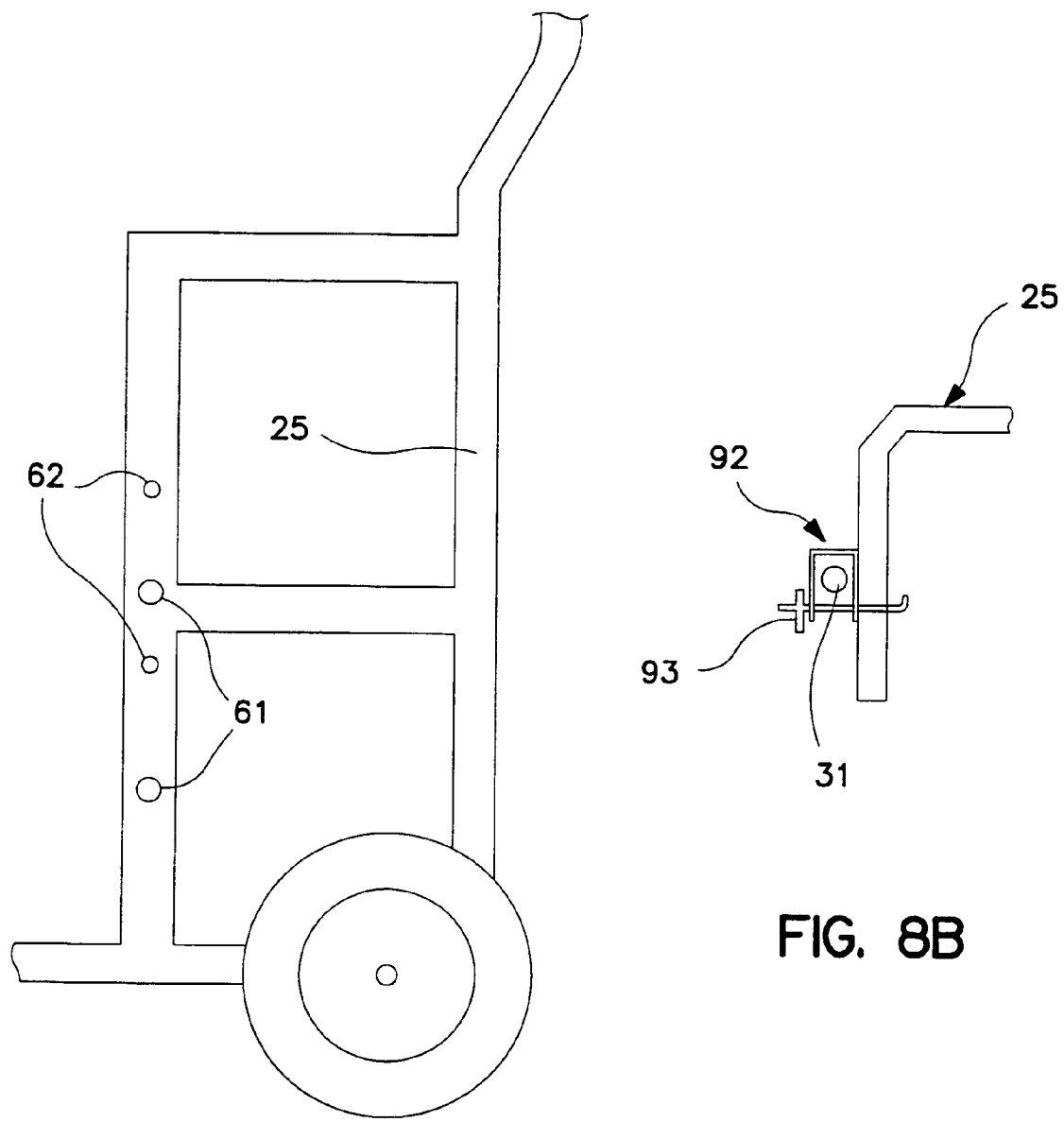
FIG. 8A illustrates details of the attachment means on the cart frame and FIG. 8B illustrates a detail of the socket lock on the cart frame.

In one embodiment, a socket lock 92 can be mounted upon the horizontal strut of cart frame 25, shown in an overhead view in FIG. 8B, in which the shaft of handle 31 (in cross section) is seen locked inside the socket lock and retained by push pin 93. The socket lock operates to hold the cage assembly from rotating in the pivot of pillow blocks 29 by retaining the handle 31 in a fixed position. To tilt the container and cage assembly, the operator removes push pin 93 from the socket lock 92, thereby freeing handle 31 for free rotation in the axis defined by shafts 35 and pillow blocks 29.

Figure 14:
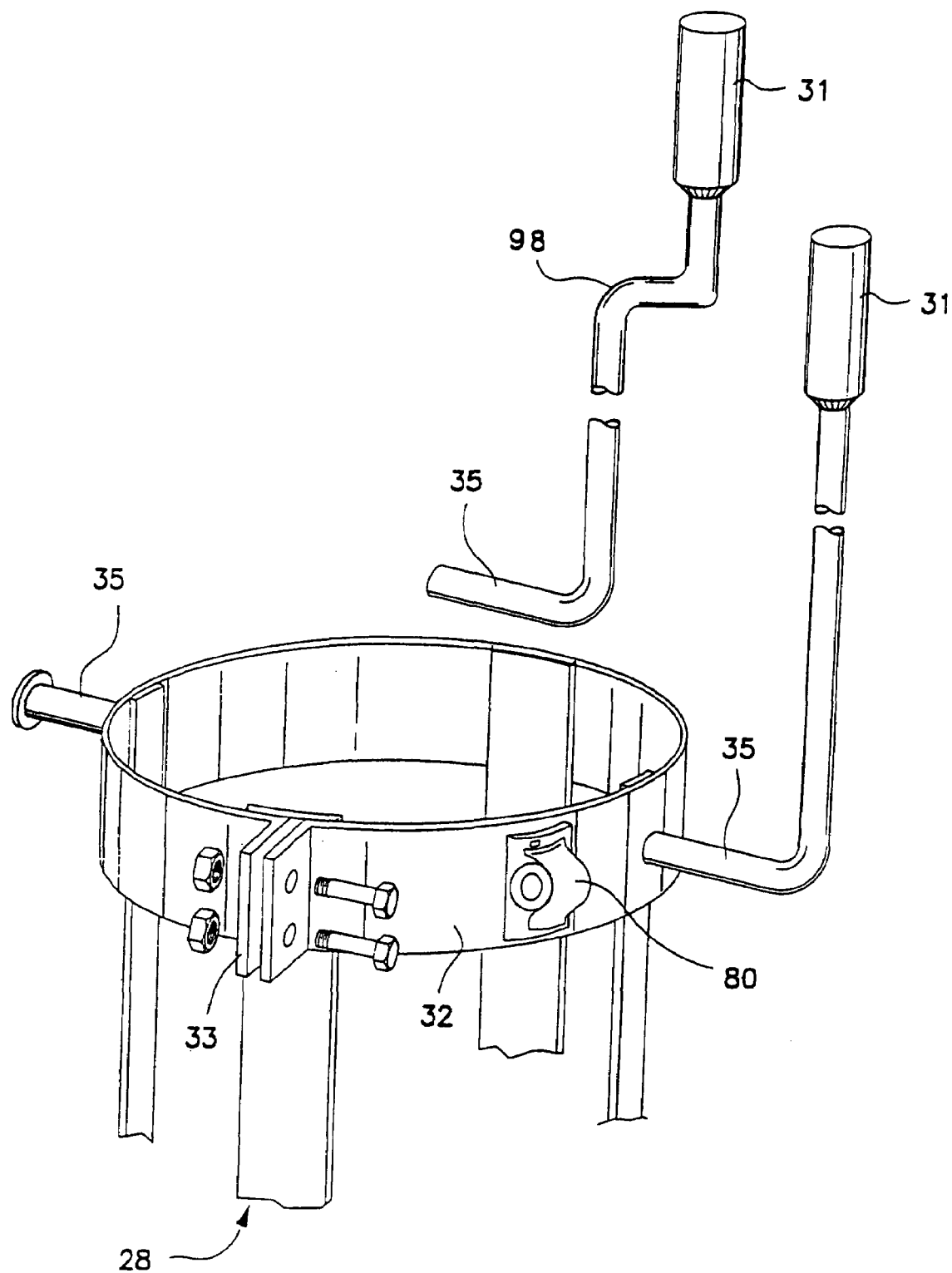
FIG. 14 illustrates embodiments of the cage assembly.

In a preferred embodiment shown in FIG. 14, the handle 31 is not a straight rod but rather is shaped to define a series of turns 98 located near the handle terminus (away from the cage assembly and after the socket lock 92) to extend the handle 31 terminus away from the cage assembly such that there is a reduced likelihood of pinch when the handle is operated to rotate and empty the container.

The handle 31 (dumping arm) can be attached to shaft 35 by a variety of means to facilitate strength or to provide ease in servicing the bearings. Exemplary attachments include bolting, welding or securing by pins to connect handle 31 to shaft 35.

Container 17 can be provided in any of a variety of shapes, including cylinders, rectangles and other shapes, and may encompass any of a variety of size capacities depending on the duty of the container. A preferred embodiment is a drum like container. In addition, it is to be appreciated that the container can be made of any of a variety of materials, including but not limited to metal, such as aluminum, steel, and metal alloys, plastics such as polyethylene, polyurethane and like plastics, including recycled plastic materials, rubber, fiberglass, carbon fiber, composites and the like materials.

The cage assembly 28 is similarly made of a variety of materials as identified above for the container, although particularly strong materials are preferred, such as stainless steel.

The cart frame 25 can also be made of a variety of materials, as indicated above, and the invention is not to be construed as so limited. Particularly preferred are lightweight and strong materials, such as carbon fiber, plastics and composite materials, and the like. In addition, it is understood that the frame can be manufactured in a variety of means, including by use of rods, tubing, square tubing, rolled flat stock, molded plastic, folded sheet metal, cast metals, and the like manufacturing means.

Figure 3:
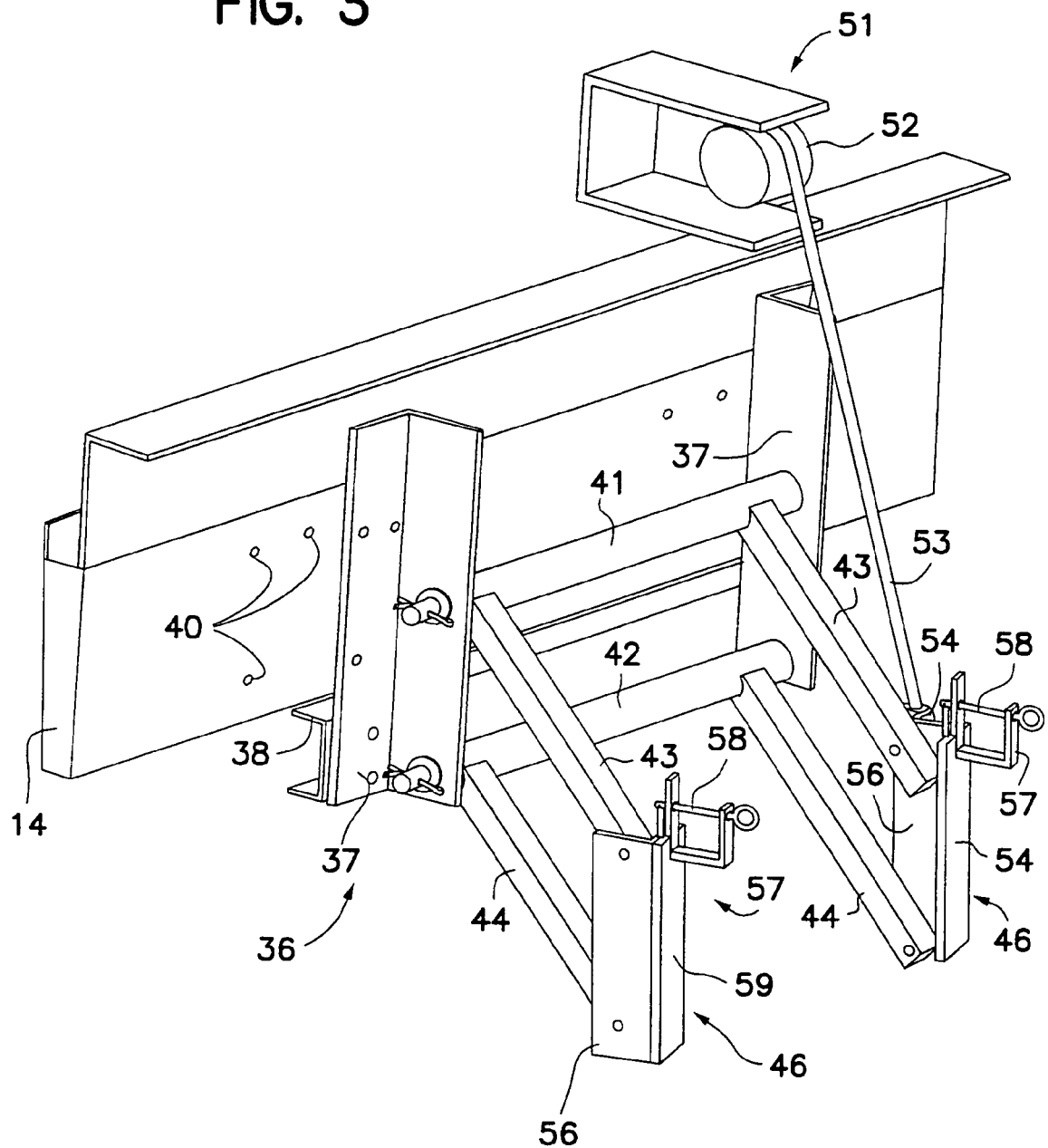
FIG. 3 is an enlarged perspective view of one embodiment of a lifting assembly that may be used to lift the cart and container for transport in accordance with the principles of this invention.

Referring now to both FIGS. 2 and 3, the lifting assembly generally designated as 36 is shown mounted to the frame 14 of the truck 10. The lifting assembly 36 is mounted to truck frame 14 using existing bolt hole patterns such as those shown at 40. If bolt holes so not exist, holes may be drilled into the frame 14 to allow the lifting assembly 36 to be mounted thereto. Alternatively, the lifting assembly could be welded to the frame or fastened by some by other means well known in the art, such as by use of hangers, clamps, bolts, fasteners, and the like.

The lifting assembly 36 includes a pair of vertical angle members 37 interconnected by a U shaped member 38 which extends from one angle member 37 to the other angle member 37. A pair of cross bar members 41 and 42 are mounted to the angle members 37 for rotary movement relative thereto. The members 41 and 42 are connected to a pair of lifting arms 43 and 44 on each side of the lifting assembly 36. At the end of each pair of lifting arms 43 and 44 there is an engaging assembly generally designated as 46. The engaging assembly 46 will be explained more fully hereinafter.

The cross bar members can be attached to angle members 37 by any of a variety of means, including bushings, sockets, bearings, and the like. A preferred means comprises the pillow block bearings 79 shown in FIG. 7, which bearings are mounted onto angle members 37 at the pivot point and on the end of cross bar members 41 and 42. A typical bushing at the pivot point is bronze or brass for better wear and fit of the cross bar members. Alternatively, a babbitted or block bearing can be used.

The lifting assembly 36 engages the shafts 35 of the cage assembly 28 holding the container 17 to lift the entire container 17, cage assembly 28 and cart assembly 18 onto the truck 10. Lifting can be accomplished by a means for moving the lifting arms, which means can be an electric or manual winch which mounted to the truck 10 and is generally designated as 51. The winch 51 has a drum 52 on which is mounted a cable 53 which has one end connected at 54 to an arm 43 of the lifting assembly 36. When the winch 51 is actuated, the pair of arms 43 and 44 rotate upwardly to lift the cart and container off the ground. Alternatively, the lifting means can be a hydraulic ram 64 as shown in FIG. 10 or a motor-driven gear assembly 65 shown in FIG. 11, which means is coupled to cross bar members 41 or 42 for rotary movement.

Figure 10:
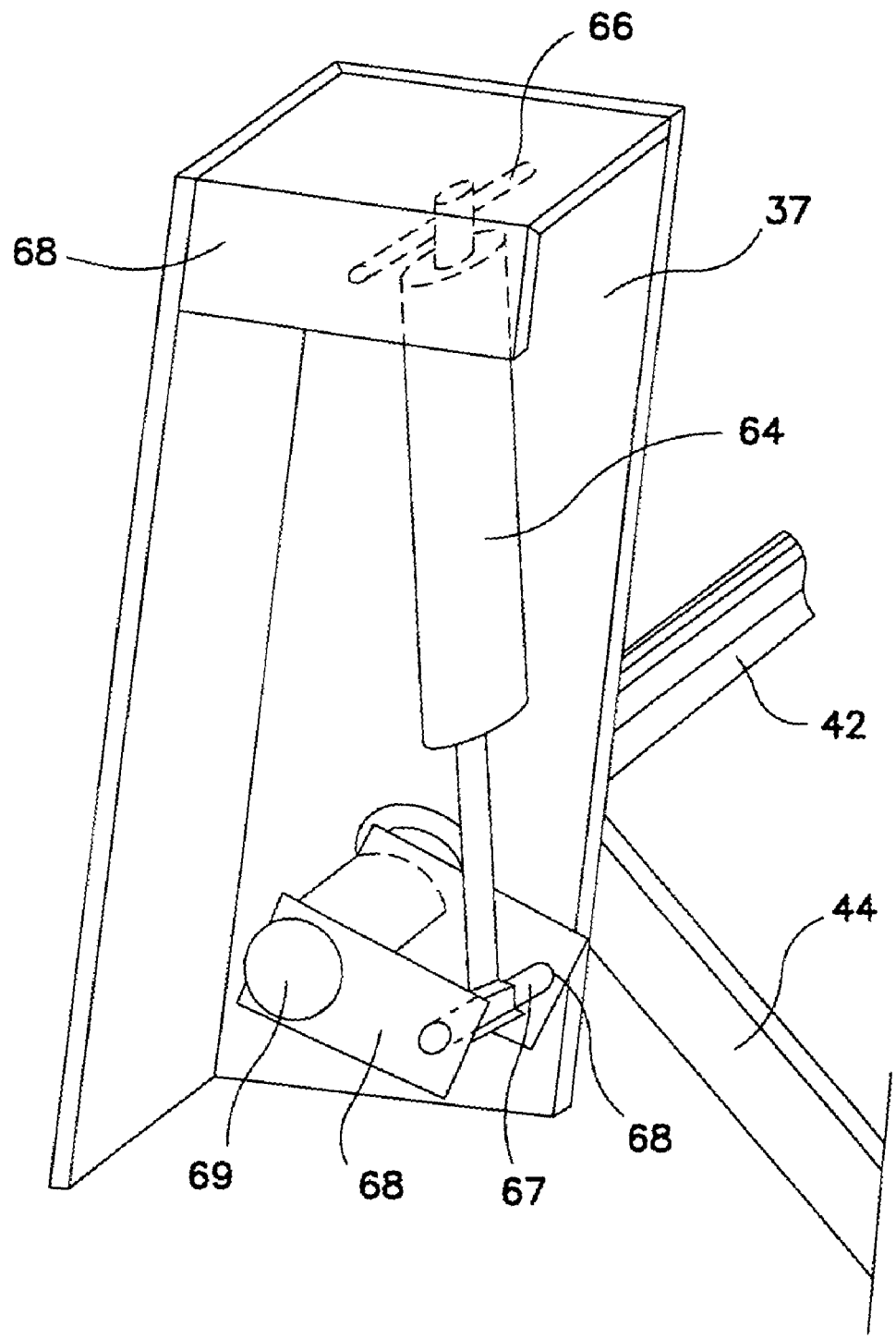
FIG. 10 illustrates a hydraulic ram used for lifting the arms of the lifting assembly.

Hydraulic ram 64 can be attached at the top by pin 66 seated onto angle member 37 and opposing plate 68, and attached at the bottom by pin 67 to flanges 68 that are attached to the extension 69 of cross bar member 42 shown in FIG. 10. Upon raising or lowering the ram, the cross bar member 42 is rotated which causes the lifting arms 44 to raise and lower.

Figure 11:
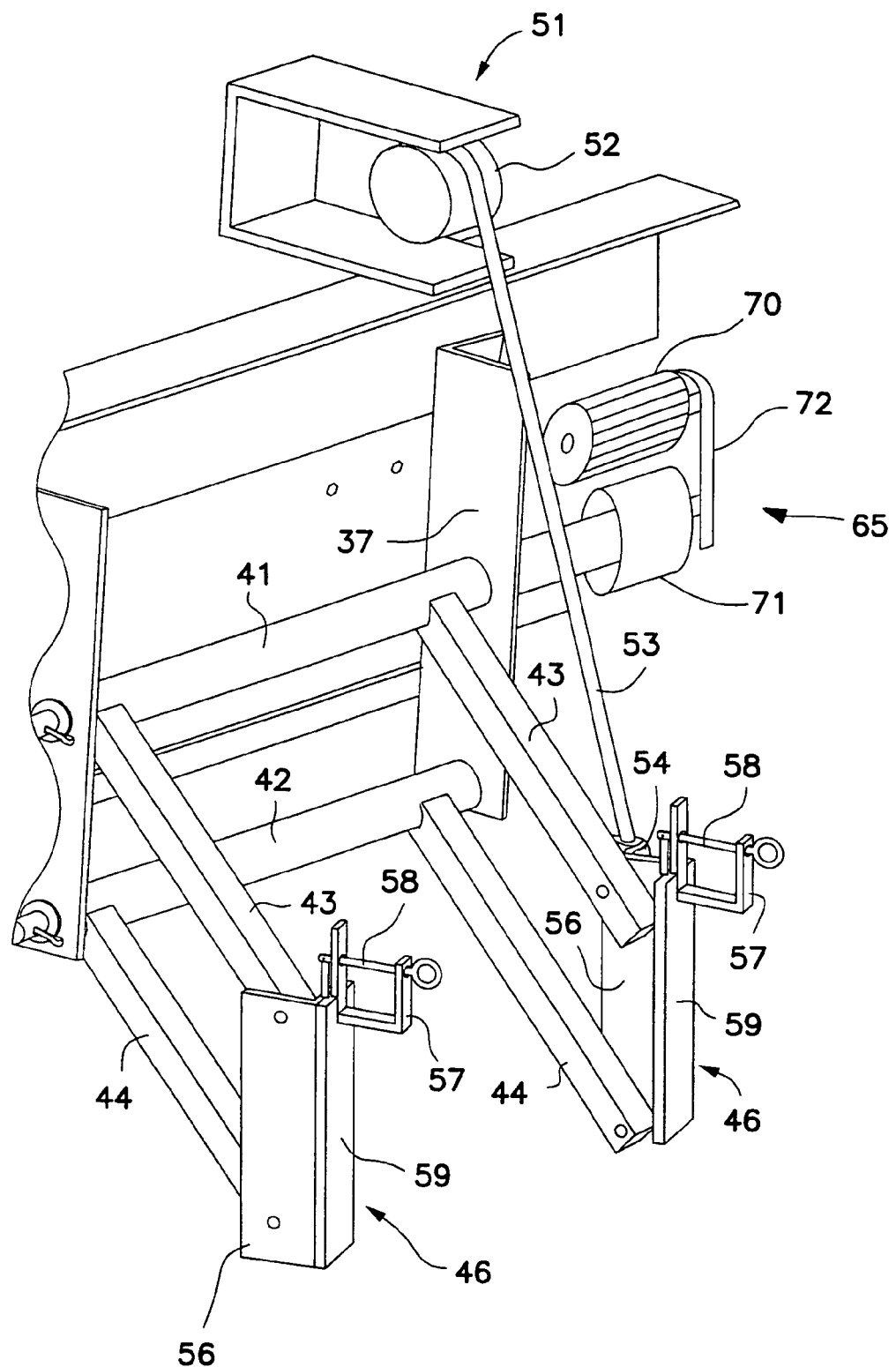
FIG. 11 illustrates the a motor lifting means used for lifting the arms of the lifting assembly.

The motor-driven gear assembly 65 can be a motor directly coupled to cross bar member 41, or motor 70 can be coupled to gear assembly 71 through a motor-gear assembly coupler 72 shown in FIG. 11. The motor drive can be electric, steam or combustion engine, and may by 12 volt and receive power from the truck battery.

An optional lid 94 can be attached and locked onto the container by use of a clamp ring 95 around the circumference of the lid fitted with a clamp ring securing latch 96 to keep all waste in the container during transport.

Figure 13:
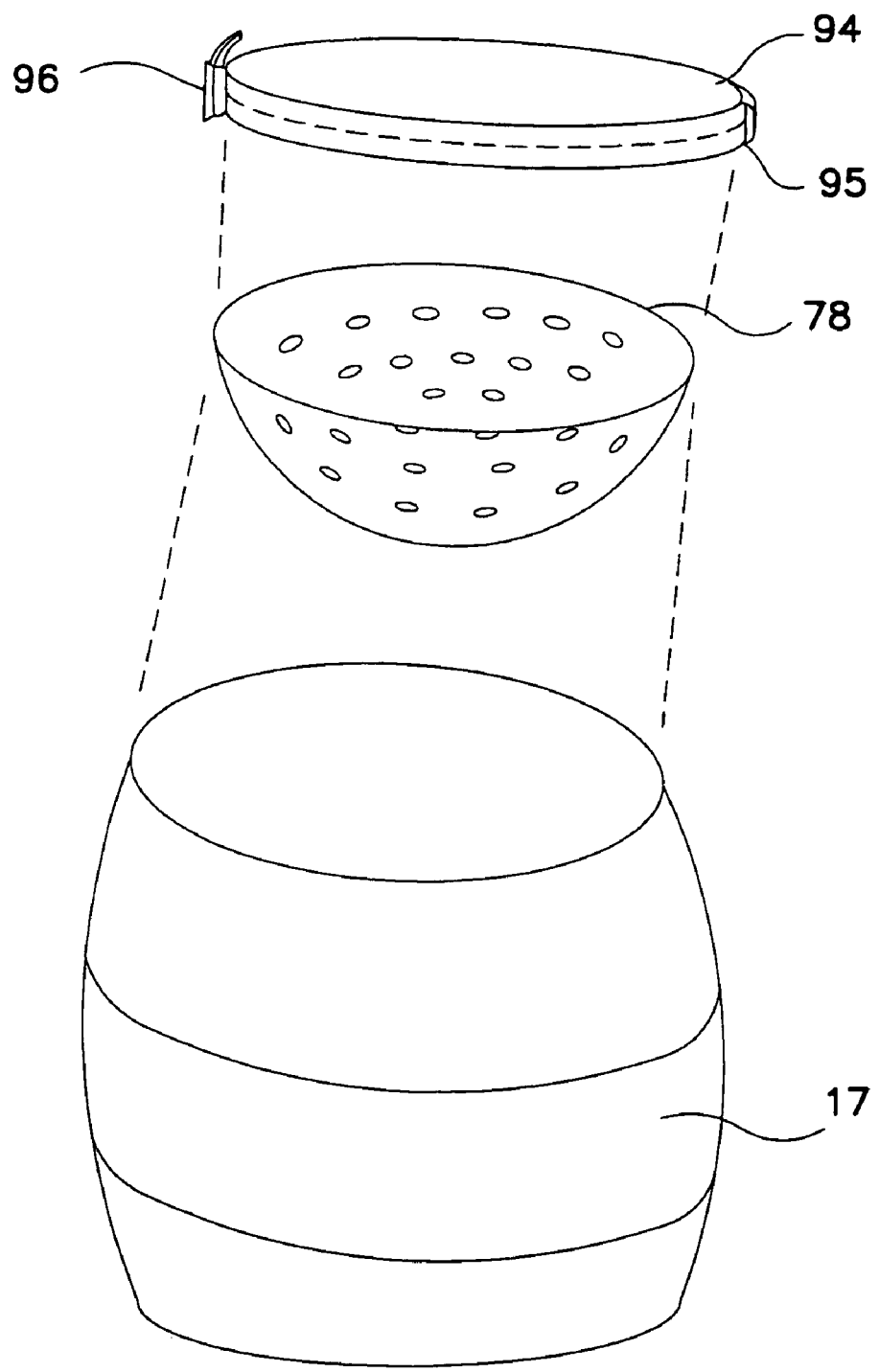
FIG. 13 illustrates an embodiment of a sieve and/or lid mounted onto the opening of the container.

In addition, the container can be fitted with a colander type sieve 78 that seats onto the opening of container 17 as shown in FIG. 13. The sieve may contain a variety of pore sizes adapted to collect particles of preselected size. A preferred sieve collects gravel typically mixed into a cement product. In a preferred embodiment, the optional lid will fit onto the container opening on a container holding a colander sieve.

Referring now to FIGS. 3 and 5, the engaging assembly 46 includes a vertical support 56 against which the vertical frame of the cart 18 is held during transport. If desired a rubber pad 59 may be bonded to support 56 to protect the cart frame 25. A pair of U shaped members generally designated as 57 each have a quick release hitch or locking pin 58 which locks each shaft 35 of the cage assembly 28 when the lifting assembly 36 engages the cage assembly.

Figure 7:
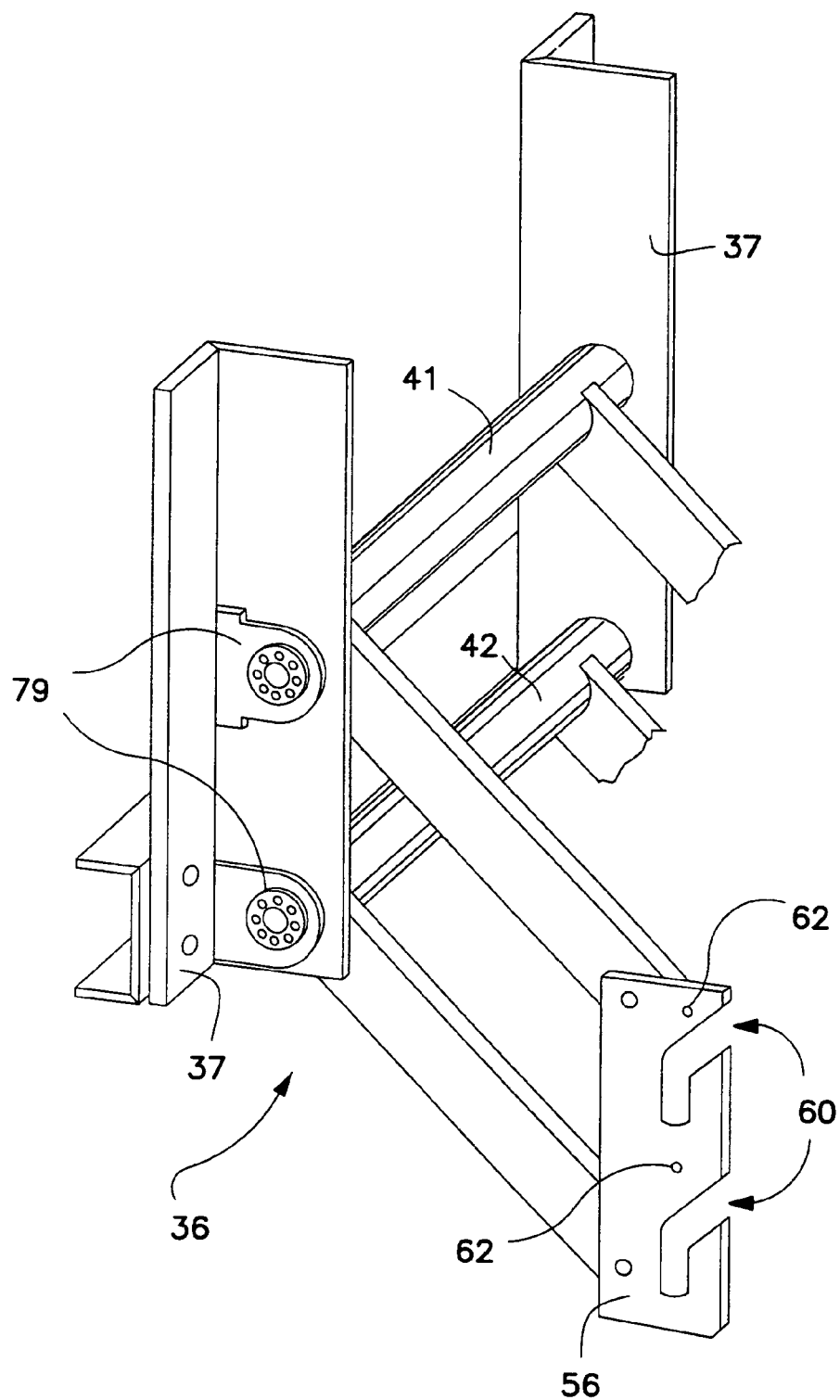
FIG. 7 illustrates alternative embodiments of the lifting assembly.
Figure 9:
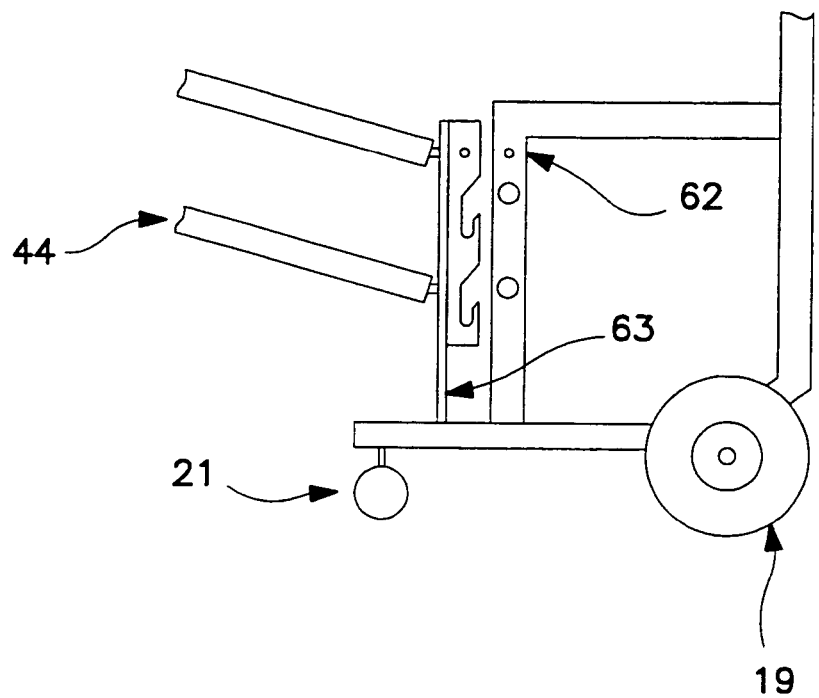
FIG. 9 illustrates an alignment of the lifting assembly to the cart for coupling the engaging assembly onto the cart frame.

Alternatively, the engaging assembly may adopt another configuration as shown in FIG. 7 which comprises a pair of lifting slots 60 positioned on vertical support 56 to seat a pair of slot engaging pins 61 on the vertical section of cart frame 25 shown in FIGS. 8 and 9. The alignment of lifting slots 60 with slot engaging pins 61 is illustrated in FIG. 9. By advancing the cart 18 towards the lifting assembly 36, the pins 61 enter and seat into slots 60 and slip downward to the bottom of the slots to secure the engagement. A preferred slot engaging pin is a solid steel pin, although the material can be varied based on the application and weight to be supported. A typical configuration uses a four inch diameter solid steel pin.

Optional stabilizing push pins can be inserted through one or more lock pin ports 62 located on both the vertical support 56 and on the cart frame 25 as shown in FIGS. 7, 8A and 9. Once the engaging pins 61 align and engage slots 60, the lock pin ports align and can receive push pins, thereby providing added hold down capability and restricting the ability of the cart to move when attached to the lifting assembly.

A further stabilizing support 63 is shown attached to vertical support 56 in FIG. 9. The stabilizing support is a vertical bar or rod attached to support 56 and has an extended length adapted to position above the top surface of a horizontal support beam of the cart frame 25 when the pins 61 are seated in slots 60, thereby restricting the vertical lift of the cart and preventing the pins from jumping out of the slots when the lifting assembly, cart and container are jostled during transportation.

Referring now to FIG. 6A there is shown the container 17 on cart 18 which is resting on the ground prior to being lifted on the truck. The lifting assembly 36 is shown in engagement with the cage assembly 28. FIG. 6C the lifting assembly 36 is shown in the fully raised position in which the cart 18 is transported on the truck. FIG. 6B shows the lifting assembly 36 in an intermediate position where the cart 18 is partially lowered to allow waste to be dumped from the container 17 while on the truck.

Figure 12:
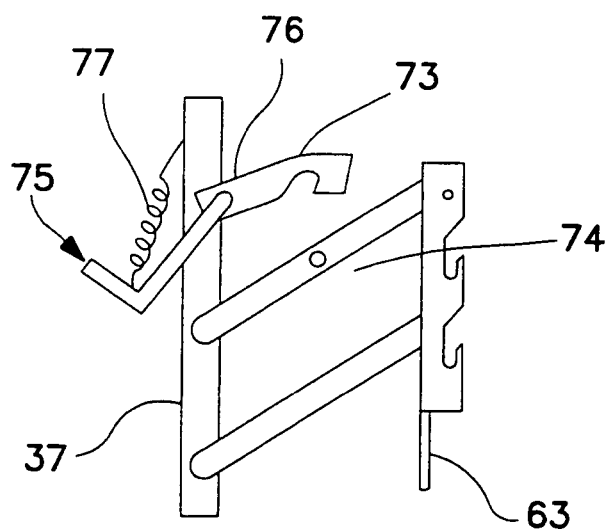
FIG. 12 illustrates a spring latch used to secure the lifting assembly in the fully raised position.

Once positioned in the fully raised position shown in FIG. 12, the lifting assembly 36 can utilize a spring latch with catch 73 mounted onto angle member 37, which latch can engage a pin 74 mounted on lifting arm 43 in order to secure the lifting assembly in the raised position. The latch 73 includes a handle 75, a pivot 76 at the point of attachment of latch 73 to member 37, and torsion spring 77 which maintains tension on the latch in the locked position to hold pin 74.

The container 17 may be agitated during transport in a number of different ways. One or more agitator or shaker devices may be mounted to the cage to agitate the cage during transit. The agitator may be electrically operated and powered by a power supply such as battery, preferably a battery on the truck. Exemplary agitator 80 shown in FIG. 14 can be a vibrating motor, preferably a pneumatic vibrator engine, and can be attached to top band 32 on cage assembly 28. The pneumatic vibrator engine, having exhaust port 85, can be quick coupled to an air supply on the truck or portable compressor using a hose 81 coupled to a nipple 82 on the vibrator, a quick coupler 83 and inline manual ball valve 84. Operation of the agitator will transmit vibrations into the liquid cement waste contained in the container, and thereby prevent cement setting (solidifying).

Alternatively, as shown in FIG. 6A, a rod 97 may be placed into the container either from the bottom, top or the sides of the container, and the rod may be agitated or vibrated during transit to prevent the waste in the container from setting.

In one embodiment, the cart frame 25 may be motorized via wheels 19 to facilitate ease of movement of heavier loads. The motor can be any of a variety of engines, including electrical, pneumatic, combustion and the like. The motor can be coupled to wheel 19 for drive by any available means.

In another embodiment, the cart frame 25 can be fitted with skis or blades instead of wheels to facilitate use in cold weather where there is snow or ice at the job site.

In use at the job site, the lifting assembly 36 is lowered and the cart 18 and container 17 are disengaged from the engaging assembly 46. The cart 18 is rolled to the end of the truck where the chute can be placed into or above the entrance into the container 17. The chute is then washed out into the container 17. Any other waste lying around the job site can be deposited by hand into the container. The cart 18 is then rolled over to the lifting assembly 36 where the engaging assembly 46 is positioned such that the U shaped members 57 engage the shafts 35 of the cage assembly 28. The locking pins 58 are inserted in place to secure the cage assembly 28 to the lifting assembly 36. The winch 51 is actuated to pull the arms 43 and 44 up to raise the cart 18 and container 17 off the ground. The winch pulls the entire assembly tight against the truck frame where it remains for transport. Safety chains or lanyards may further secure the apparatus for transport. At the cement production facility, the winch is reversed to lower the cart 18 to the ground or to the position shown in FIG. 6B to allow waste to be dumped while the apparatus is on the truck. When the apparatus is lowered to the position shown in FIG. 6A, the locking pins 58 are released to allow the engaging assembly 46 to disengage from the shafts 35 of the cage assembly. The cart 18 can then be wheeled to wherever the cement and concrete waste is to be disposed of.

Thus it is seen that the invention is suited for use in collecting and disposing of cement waste at the site of generating the waste. In this regard, it is understood that the apparatus and methods can be used for a variety of wastes, including pumped concrete waste and/or wash from the concrete storage tank, boom pump waste and/or wash from the boom, and any liquid environmental waste that is to be collected and transported from the site of collection.

Insofar as the cart and container can be used independent of the lifting assembly mounted on the truck, as described herein, the invention further contemplates an apparatus comprising cart 18 supporting container 17 by means of cage assembly 28, which apparatus is free from lifting assembly 36.

Although the present invention has been described in terms of certain preferred embodiments and exemplified with respect thereto, one skilled in the art will readily appreciate the various modification, changes, omissions, and substitutions that may be made without departing from the spirit and scope of the present invention. It is intended that the present invention be limited solely by the scope of the following claims.

What is claimed is:

1. An apparatus for the collection and transportation of cement waste comprising:
   a container to receive cement waste;
   cart means for supporting and moving the container
   means mounted to the frame of a cement mixer truck between the cab of the truck and the mixer for lifting the cart means and container off of a ground surface for transport of the cement waste
   said means for lifting comprising a pair of arms, each of said arms having a first end for engaging said cart means and a second end attached to a vertical angle member;
   said angle member being mountable onto said truck frame; and
   said second end being rotatably movable relative to said angle member.

2. The apparatus of claim 1 wherein said first end engages a frame portion of said cart means.

3. The apparatus of claim 2 wherein said cart means comprises a frame having a pair of slot engaging pins and said first end comprises a vertical support having a pair of vertical slots for seating said pair of slot engaging pins.

4. The apparatus of claim 1 wherein said first end engages said pair of shafts on said cart means.

5. The apparatus of claim 1 wherein said means for lifting further comprises winch means including a cable having a free end of said cable attached to the first end of one of the said arms.

6. The apparatus of claim 1 wherein said means for lifting further comprises a hydraulic ram coupled to one of said arms.

7. The apparatus of claim 1 wherein said means for lifting further comprises a motor-driven gear assembly coupled to one or more of said arms.

8. The apparatus of claim 1 wherein said means for lifting further comprises a spring latch with catch pivotably mounted on said vertical angle member and a pin mounted on said arm positioned to present the pin into said catch when said lifting means are in the fully raised position.

9. The apparatus of claim 1 further comprising means for agitating the cement waste in the container during transport.

10. The apparatus of claim 9 wherein the agitating means is a vibrating device attached to the container to cause the contents of the container to vibrate.

11. The apparatus of claim 10 wherein said agitating means is a pneumatic vibrator motor.

12. The apparatus of claim 9 wherein the agitating means is electrically connected to the electrical system of the cement truck.

13. The apparatus of claim 9 wherein the agitating means comprises a rod inserted into the waste in the container.

14. The apparatus of claim 1 wherein said cart means comprises wheels for transport of said cart means, a cart frame and a brake mechanism attached to said frame, wherein said brake can be actuated to prevent rotation of said wheel.

15. The apparatus of claim 1 wherein said container comprises a removable colander type sieve fitted at the opening of said container.

16. The apparatus of claim 1 wherein said container comprises a removable lid having a clamp ring to secure said lid over the opening of said container.

17. The apparatus of claim 1 wherein said container is plastic or metal.

18. The apparatus of claim 1 wherein said means for lifting further comprises a spring latch.

19. An apparatus for the collection and transportation of cement waste comprising:

a container to receive cement waste;

cart means for supporting and moving the container;

means mounted to the frame of a cement mixer truck between the cab of the truck and the mixer for lifting the cart means and container off the ground for transport of the cement waste;

said cart means comprising cage means rotatably mounted to the cart means for holding the container and allowing the container to tilt relative to the cart means;

said cage means comprising at least one band encircling said container with a pair of shafts extending from the opposite sides of said band;

said cart means comprising means for rotatably receiving said shafts of said cage means;

said cart means further comprising means for rotating the container forward and backward about the axis of said shafts; and said means for rotating the container about the axis of said shafts comprising a shaft extension with a handle attached to one of said shafts, said shaft extension being angled to provide leverage for effecting tilt of said container.

20. The apparatus of claim 19 wherein said cart means comprises a cart frame with a horizontal strut and a socket lock mounted on said strut positioned to receive and lock upon said shaft extension as said container is rotated to the vertical position.

* * * * *